United States Patent [19]

Falcon

[11] Patent Number: 4,865,393

[45] Date of Patent: Sep. 12, 1989

[54] METHOD AND APPARATUS FOR BRAKING A DERRICK WINCH

[75] Inventor: Jean-Francois Falcon, Marolles en Brie, France

[73] Assignee: Schlumberger Technology Corporation, Houston, Tex.

[21] Appl. No.: 68,093

[22] Filed: Jun. 29, 1987

Related U.S. Application Data

[63] Continuation of Ser. No. 690,801, Jan. 11, 1985, abandoned.

[30] Foreign Application Priority Data

Jan. 13, 1984 [FR] France .................. 84 00517

[51] Int. Cl.⁴ .......................................... B66D 1/48
[52] U.S. Cl. .................... 303/15; 254/273; 254/379; 175/27; 303/20
[58] Field of Search .......... 188/77 R, 181 T, 181 C, 188/182, 140 A, 137, 138; 303/13, 15, 3, 93, 94, 95, 97, 100, 101, 103, 112; 187/44, 45, 29 A, 29.1; 60/388, 393; 91/361, 363 R, 367, 453; 192/9, 35, 1, 3 N, 3 R, 2, 1.22, 1.21; 318/612, 676, 675; 254/273, 272, 274, 270, 275, 378, 379; 175/27, 162

[56] References Cited

U.S. PATENT DOCUMENTS

| | | | |
|---|---|---|---|
| 2,271,247 | 1/1942 | Brown et al. | 188/204 A |
| 3,461,978 | 8/1969 | Whittle | 254/273 |
| 3,632,177 | 1/1972 | Packer | 188/181 C |
| 3,671,082 | 6/1972 | Stevens | 303/93 |
| 3,759,489 | 9/1973 | Jones | 254/273 |
| 4,046,355 | 9/1977 | Martin | 254/273 |
| 4,076,327 | 2/1978 | Hubbard | 303/20 |
| 4,093,184 | 6/1978 | Wieschel | 188/77 R |
| 4,131,325 | 12/1978 | Bayliss | 303/93 |
| 4,434,971 | 3/1984 | Cordrey | 175/27 |
| 4,662,608 | 5/1987 | Ball | 254/273 |
| 4,696,377 | 9/1987 | Richardson et al. | 188/170 |

FOREIGN PATENT DOCUMENTS 0188746 11/1983 Japan .................. 303/97

*Primary Examiner*—Alvin Oberley
*Attorney, Agent, or Firm*—Stephen L. Borst

[57] ABSTRACT

The invention relates to the braking, by means of a control lever, of the winch of a derrick equipped with a band brake and located away from the lever. The lever and the band brake are included in a servo-control circuit and connected by an electric transmission line. A force return is provided on the lever by means of a torque motor receiving the position error signal relative to the mobile end of the band in relation to the control value position given by the lever.

9 Claims, 1 Drawing Sheet

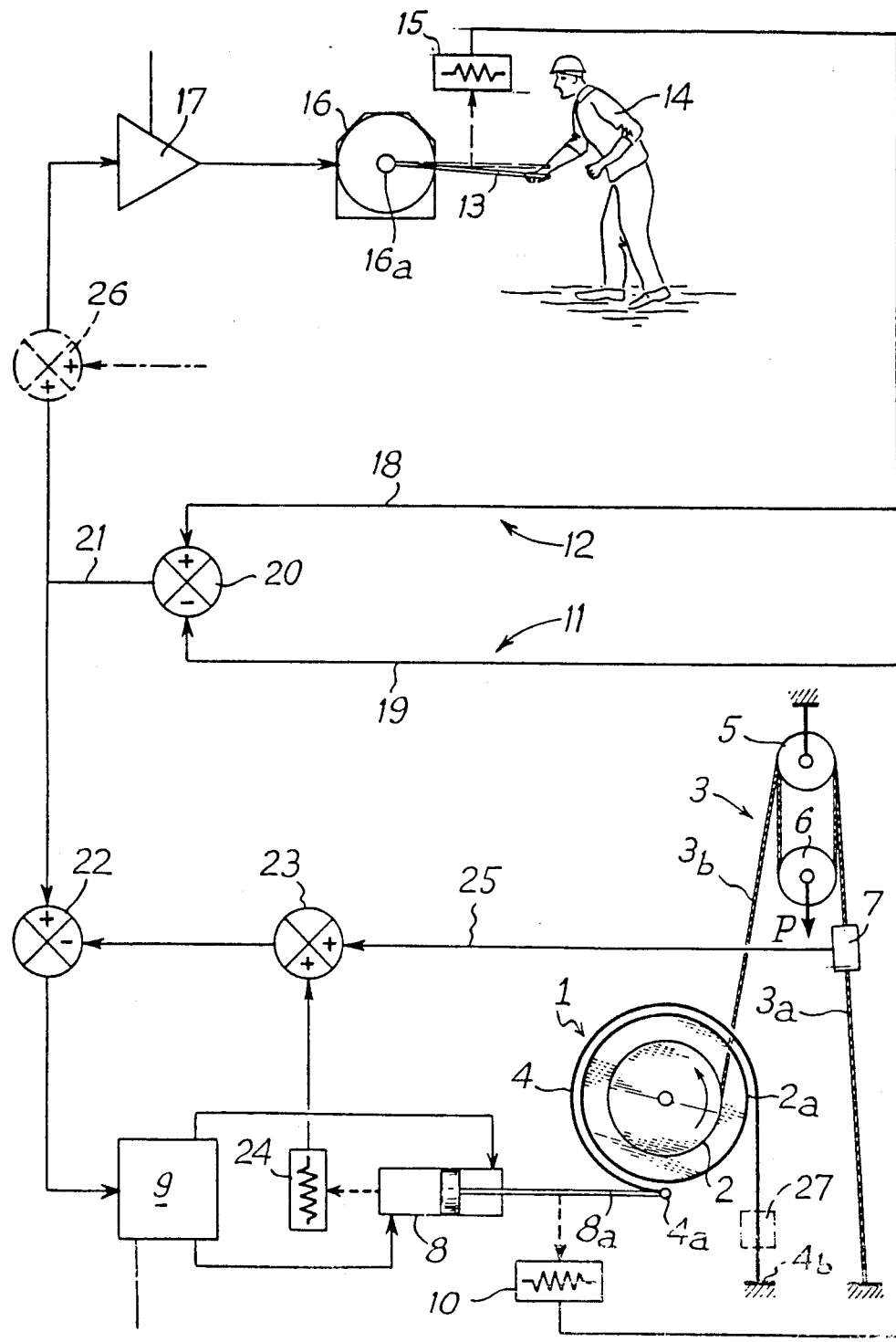

METHOD AND APPARATUS FOR BRAKING A DERRICK WINCH

This is a continuation of co-pending application Ser. No. 690,801 filed on Jan. 11, 1985, now abandoned.

BACKGROUND OF THE INVENTION

1. Technical Field

The present invention relates to the application of braking, through a control lever, on a drilling derrick winch equipped with a band brake located away from the control lever.

2. Background Information

It is known that derricks, used in particular in the oil industry for deep drilling by means of a bit mounted at the end of a drill string, include a winch whose rope actuates the travelling block of a hoist allowing the handling of the drill string during the formation or extension, lowering, raising and dismantling of drill pipes, as well as during drilling operations. In the successive phases of drill string lowering, the winch is braked by means of the band brake with which it is equipped and which is actuated by an operator using a control lever. Since the structure of a derrick and the drilling elements such as the winch, rope and lifting hoist, mud injection swivel, kelly, drill pipes, drill collars and drill bits are well known to those of the art, we shall not dwell upon these points in the description of the invention.

According to a conventional arrangement, the control lever acts mechanically directly on the band of the brake. To enable the operator to observe the operations performed on the drill string, the winch should be placed near the rotary table which imparts rotation to the drill string through the kelly. This arrangement has the drawback of taking up room on the working platform around the rotary table, capable of hindering operations on the drill string. Moreover, the winch constitutes a considerable load for the platform.

To overcome these drawbacks, one prior art approach is to move the winch away from the rotary table and place it, for example, on the ground or on a lower platform of the derrick support structure, thus freeing and lightening the weight on the working platform. The control lever, remaining on the platform, is then linked with the band brake of the winch by either mechanical (control linkage) or hydraulic transmission means. Satisfactory actuation of the band brake is however not achieved owing to the play and lack of rigidity inevitable in a mechanical transmission system, or slow response times of the elements of a hydraulic transmission system. And, the braking of a derrick winch, owing to self-blocking phenomena, must be extremely precise and calls for considerable sensitivity and skill on the part of the operator, to avoid catastrophic consequences for the drill string, being poorly suited to such transmission imperfections between the control lever and the band brake. In the case of hydraulic transmission, problems are also encountered during the installation and removal of hydraulic transmission lines (due in particular to the complexity of the operations and to the risk of losing hydraulic fluid or polluting this fluid).

SUMMARY OF THE INVENTION

It is the object of the present invention to provide a precise braking system for a derrick winch using a control lever located at an advantageous point near the rotary table and far from the winch, and overcoming the above-mentioned drawbacks.

This object is attained through a method wherein the control lever acts on the band brake with the aid of servo-control means and with an electric transmission link between the control lever and the band brake. It is thus possible, by servo-control, to obtain very precise control of the band brake, the link between this brake and the control lever being electrical and hence requiring only a simple electrical connection between the control lever and the winch.

The variable interlocked with the position of the control lever may be the winch rotating speed, i.e. the lowering speed of the load suspended from the travelling block of the hoist whose fixed block is attached at a suitable level to the derrick. It is however preferable, according to the invention, to control the position of the actuating point of the brake band (i.e. ordinarily the mobile end of the brake) in relation to the position given by the control lever, with a force return on the lever.

This force return can be obtained by slaving the position of the actuating point of the band as a function of the position of the control lever and of the force on the band, and by applying to the control lever a force which is a function of the position error of the actuating point of the band in relation to the position of the control lever, so as to carry over the force to the latter. This force can in particular be proportional to the position error.

In an advantageous embodiment, the condition of equilibrium of the servo-control means, for a given position of the control lever, is shifted as a function of the weight of the load on the winch, i.e. on the fixed block of the hoist, and more particularly, in proportion to this weight. In this way, to the rest position of the lever corresponds a braking force adapted to the load to be braked. Moreover, the control force to be applied to the lever to brake a moving load becomes practically independent of the weight of this load, thus facilitating the work of the operator.

It is another object of the invention to provide an apparatus allowing the implementation of the method defined above. This apparatus comprises a servo-control circuit including an electric transmission line carrying the control signals between the control lever and the band brake. Such an electric line, easy to install and remove, advantageously replaces mechanical linkages and hydraulic lines of similar prior art systems.

The servo-control circuit is preferably a position servomechanism which governs the position of the actuating point of the band of the brake in relation to the position given at the control lever, with the force applied to the band being carried over to the lever. The servomechanism could also cover the winch rope reeling speed.

In an advantageous embodiment, the apparatus according to the invention comprises a first position transducer associated with the control lever and a second position transducer associated with the band actuating point. The signals delivered by these position transducers are applied to a first comparator which delivers an error signal applied, on the one hand, to a band actuating device via a second comparator to which is applied a signal coming from a force transducer measuring the force applied to the band, and, on the other hand, to a torque motor on the shaft of which is coupled, in a purely mechanical and reversible manner, the control lever, the latter being directly fitted on the torque motor shaft in the simplest case. A reversible reducer could, if necessary, be placed between the control lever and the shaft. The force transducer measuring the force applied to the band can be coupled directly to the band, for example placed between its fixed end and its anchoring point. It may however be easier to couple this transducer to the band actuating device which is advantageously made up of a hydraulic cylinder supplied by a servo-valve itself controlled by the signal coming from the second comparator, or even by an electric control motor associated with a screw-nut or similar system and controlled, via an amplifier, by the signal from the second comparator.

Another interesting arrangement consists in providing a force transducer to measure the load supported by the winch, i.e. by the fixed block of the hoist, and in applying the signal it delivers to the device actuating the band or the control lever with a suitable sign to create a braking force varying with the load, which may be proportional thereto, which is combined with the braking force corresponding to a given position of the control lever. This ensures that, when the control lever is at rest, a braking force is applied to the winch which is a function of the load applied to the deadline or to the fastline of the rope, through the hoist. Moreover, each winch braking operation takes place roughly independently of the value of the weight handled by its rope.

BRIEF DESCRIPTION OF THE DRAWINGS

Other characteristics and advantages of the invention will appear more clearly from the following description given in connection with the appended drawings relative to a nonlimitative example.

The only FIGURE gives a simplified schematic representation of a braking apparatus according to the invention.

DESCRIPTION OF PREFERRED EMBODIMENT

The winch 1 of a derrick comprises a drum 2 driven by a motor (not shown) on which is wound a rope 3, and a band brake 4 whose actuation makes it possible to brake and stop the reeling of the rope 3. The rope 3 runs over the pulleys of a pair of blocks 5, 6 of a hoist, the upper block 5 being fixed to the top of the derrick and the lower block 6 being mobile and supporting the load (drill string, etc.) of a variable weight P. The non-moving deadline 3a of the rope 3 leaving the fixed block is anchored at a suitable fixed point of the derrick supporting structure, while the travelling strand (also called the fastline) 3b of the rope 3 is wound on the winch 1 after having left the fixed block 5 of the hoist. The braking band 4, which can be split into two bands operating in parallel, is applied on the rim 2a of the drum 2 when it is actuated, by its moving end 4a (its other end being anchored at a fixed point) by means of a double-acting hydraulic cylinder 8 controlled by a servo-valve 9, the rod 8a of the cylinder 8 being coupled to a position transducer. 10. The hydraulic cylinder may be replaced by a servocontrol motor associated with a screw-nut system.

The preceding elements constitute a slave assembly 11, controlled by a master assembly 12 located at a distance, comprising essentially a mobile control lever 13 which can be actuated by an operator 14 and is coupled to a position transducer 15, the control lever 13 being located on the working platform carrying the rotary table (not shown), while the winch 1 is installed at a suitable location far from the rotary table. The lever 13 is fixed radially to the shaft 16a of an electric torque motor 16 and swivels angularly with this shaft. The torque motor 16 is supplied by a power amplifier 17. The master and slave assemblies 12 and 11 respectively are connected only by electric conductors.

The electric signals delivered by the position transducers 15 and 10 are applied, via conductors 18 and 19, to a first comparator 20 delivering an error signal on an output conductor 21. This signal is applied via a second comparator 22 (which also receives through a third comparator 23 the signal coming from a force transducer 24 coupled with the cylinder 8) to the servo-valve 9 and also to the amplifier 17.

The apparatus operates in the following manner: When the operator 14 who is on the work platform at a suitable location ensuring good visibility during the operations wishes to brake the winch 1 during the lowering of the drill string, i.e. of the load P, he lowers the lever 13. A control (set value) signal is transmitted by the transducer 15 toward the comparator 20 which, also receiving the signal transmitted by the transducer 10, delivers an error signal at its output 21. This signal controls the servo-valve 9 so that the cylinder 8 actuates the band 4 to bring it to a clamping position on the rim 2a of the drum 2 where the signal transmitted by the transducer 10 tends to reduce the error signal. In fact, the signal applied to the servo-valve 9 results from the combination in the comparator 22, of the error signal and the signal transmitted by the transducer 24 representative of the force applied to the band 4, and is cancelled when these two signals are equal. Thus, the error signal reflects the force applied to the brake band. Being applied to the torque motor 16, this signal produces on the control lever 13 a force return torque which is felt by the operator 14. It will be noted that, conversely, for a position given by the operator with the lever 13, any variation in the force on the band 4 is transmitted to the transducer 24. The signal transmitted by this transducer is thus modified, thereby producing a variation in the error signal at the output of the comparator 22 entailing a variation in the position of the rod 8a of the cylinder 8, hence leading to a modification of the signal from the transducer 10 transmitted to the motor 16 by the comparator 20 and the amplifier 17: the operator 14 feels this variation in force. The system thus has complete reversibility.

It will be noted that, in the event of the failure of one of the elements carrying out the force return on the lever 13, it is always possible to control the band brake from the winch because it then swivels with no load while rotating the shaft 16a of the motor 16.

In the deadline 3a of the rope 3 a force transducer 7 can be inserted whose output is connected by a conductor 25 to the second input of the comparator 23 whose first input receives the signal coming from the transducer 24. This arrangement entails a constant displacement of the state of equilibrium of the servo-control circuit proportional to the weight P or, more generally, according to the weight P of the load of which a fraction is applied to the winch 1. Consequently, when the control lever 13, released by the operator 14, comes to its rest position, the torque motor 16 no longer being supplied with electric current, a certain braking force is exerted by the band brake 4 on the drum 2 of the winch 1, this force being a function of the load suspended from the travelling block 6 of the hoist 5, 6. Moreover, load braking operations become practically independent of load weight, whereas this weight varies constantly with borehole depth and hence with the length of the drill string and the casing to be placed in the hole.

As a variant, the signal coming from the transducer 7 can be applied, not to the input of the comparator 23, but to an input of a comparator 26 placed between the comparator 20 and the amplifier 17, as indicated by the broken lines in the FIGURE (the comparator 23 can then be eliminated).

In another variant, the transducer 24 can be replaced by a transducer 27 placed at the fixed end 4b of the band 4.

I claim:

1. Apparatus for braking a derrick winch with a winch brake, comprising:
   a control lever remotely located from said winch;
   a servo-control circuit connecting said lever and said brake for actuating said brake in response to movement of said lever, and including:
   a torque motor having a shaft mechanically coupled to said control lever;
   a brake activating device for actuating said winch brake;
   a first position transducer for sensing the position of said control lever;
   a second position transducer for sensing the position of said winch brake;
   a first force transducer for measuring the force applied to said winch brake;
   a first comparator;
   a second comparator;
   said first comparator being connected to receive signals from said first and second position transducers and to deliver an error signal to said torque motor and to said second comparator; and
   said second comparator being connected to receive signals from said first comparator and from said first force transducer and to deliver an error signal to said actuating device.

2. Apparatus as in claim 1, wherein said control lever is fitted directly on said shaft of said torque motor.

3. Apparatus as in claim 1, wherein said force transducer for measuring the force applied to said winch brake is coupled to the brake actuating device.

4. Apparatus as in claim 1, wherein said brake actuating device comprises a servo-valve controlled by the output signal of said second comparator; and a hydraulic cylinder supplied by said servo-valve.

5. Apparatus as in claim 1, wherein said winch brake has a moving end and said brake actuating device comprises means electrically controlled by the output signal from said second comparator for creating a braking force and to mechanically drive the moving end of said winch brake.

6. Apparatus as in claim 1, further comprising a third comparator and a second force transducer for measuring the weight of a load supported by said winch: said third comparator being connected to deliver said first force transducer signal to said second comparator after combining it with a signal from said second force transducer representative of said load weight.

7. Apparatus as in claim 5, characterized in that the braking force created is proportional to the weight.

8. A method for braking a derrick winch with a winch brake having a winch brake actuator comprising the steps of:
   sensing the position of remotely located control lever and producing a first signal indicative thereof;
   sensing the position of said winch brake actuator and producing a second signal indicative thereof;
   comparing said first and said second signals and applying a third signal indicative of the difference therebetween to a force applying means for applying a force to said control lever;
   sensing the force applied on said winch brake by said winch brake actuator and producing a fourth signal indicative thereof;
   comparing said third and said fourth signals and applying a fifth signal indicative of the difference therebetween to said winch brake actuator.

9. The method of claim 8 further including the steps of sensing the load placed on said derrick winch and generating a sixth signal indicative thereof; combining said sixth signal, said fourth signal and said third signal to generate said fifth signal.

* * * * *